US006969340B2

United States Patent
Tokura et al.

(10) Patent No.: US 6,969,340 B2
(45) Date of Patent: Nov. 29, 2005

(54) CONTROL APPARATUS AND CONTROL METHOD FOR AUTOMATIC TRANSMISSION

(75) Inventors: Takaaki Tokura, Toyota (JP);
Tomohiro Asami, Nissin (JP); Hideki Takamatsu, Anjo (JP); Norimi Asahara, Nishikamo-gun (JP); Katsumi Kono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 81 days.

(21) Appl. No.: 10/810,636

(22) Filed: Mar. 29, 2004

(65) Prior Publication Data

US 2004/0192500 A1 Sep. 30, 2004

(30) Foreign Application Priority Data

Mar. 28, 2003 (JP) .............................. 2003-089861

(51) Int. Cl.[7] .......................... F16H 61/08; B60K 41/06
(52) U.S. Cl. ...................................... 477/109; 477/143
(58) Field of Search ............................... 477/109, 143, 477/156

(56) References Cited

U.S. PATENT DOCUMENTS 5,046,383 A * 9/1991 Butts et al. ................. 477/120
5,207,122 A * 5/1993 Minagawa ................... 475/123
5,304,102 A * 4/1994 Narita et al. ................. 475/125
5,865,708 A * 2/1999 Nishio et al. ................ 477/155

FOREIGN PATENT DOCUMENTS

JP         10-184410        7/1998

* cited by examiner

Primary Examiner—Sherry Estremsky
(74) Attorney, Agent, or Firm—Oblon, Spivak, McClelland, Maier & Neustadt, P.C.

(57) ABSTRACT

A control apparatus and method for an automatic transmission, by which a shift is executed by simultaneously controlling release and application of different friction engaging elements, are provided which i) control a clamping force of a friction engaging element to be released and a clamping force of a friction engaging element to be applied, ii) adjust an output torque of a prime mover for driving a vehicle, iii) detect a predetermined timing that is after the start of a torque phase during a shift of the automatic transmission and before the clamping force of the friction engaging element to be applied increases to the point at which torque input to the automatic transmission can be transmitted by only the friction engaging element to be applied, and iv) output a command to gradually reduce the clamping force of the friction engaging element to be released and a command to gradually increase the clamping force of the friction engaging element to be applied, in the torque phase.

18 Claims, 5 Drawing Sheets

|  | C1 | C2 | C3 | C4 | B1 | B2 | B3 | B4 | F0 | F1 | F2 | F3 |
|---|---|---|---|---|---|---|---|---|---|---|---|---|
| P |  |  |  |  |  |  |  |  |  |  |  |  |
| R |  |  | O | ◎ |  |  | O |  | O |  |  |  |
| N |  |  |  |  |  |  |  |  |  |  |  |  |
| 1st | O |  |  | ◎ |  |  |  | ◎ | O |  |  | O |
| 2nd | O |  |  | ◎ |  | ◎ | O |  | O | O | O |  |
| 3rd | O |  | O | ◎ | ◎ |  | △ |  | O | O |  |  |
| 4th | O | O | △ | ◎ |  |  | △ |  |  | O |  |  |
| 5th | △ | O | O |  | O |  | △ |  |  |  |  |  |
| 6th | △ | O |  |  | △ | O | △ |  |  |  |  |  |

O APPLIED
◎ APPLIED DURING ENGINE BRAKING
△ APPLIED BUT NOT EFFECTIVE

CONTROL APPARATUS AND CONTROL METHOD FOR AUTOMATIC TRANSMISSION

INCORPORATION BY REFERENCE

The disclosure of Japanese Patent Application No. 2003-089861 filed on Mar. 28, 2003, including the specification, drawings and abstract is incorporated herein by reference in its entirety.

BACKGROUND OF THE INVENTION

1. Field of the Invention

The invention relates to a control apparatus and control method for an automatic transmission mounted in a vehicle. More specifically, the invention relates to a control apparatus and control method for controlling a clutch-to-clutch shift.

2. Description of the Related Art

An automatic transmission mounted in a vehicle is constructed of a combination of a torque converter, into which output from an engine is input, and a gear shift mechanism which is driven by output from the torque converter. The automatic transmission is shifted automatically into a predetermined speed according to a request from the driver and the operating state of the vehicle by selective application and release of a plurality of friction engaging elements such as clutches and brakes so as to change the power transmission path of the gear shift mechanism. In this kind of automatic transmission, a friction engaging element for an engine brake is provided in addition to the friction engaging elements for shifting. Generally, when driving, this engine brake friction engaging element transmits power. When decelerating in a predetermined gear speed such as first range or second range, however, the engine brake friction engaging element is also applied, but in this case serves as an engine brake.

In this kind of automatic transmission, a shift may also be performed by switching friction engaging elements in such a way that control to apply one friction engaging element and control to release another friction engaging element are performed simultaneously (this kind of shift is often referred to as a clutch-to-clutch shift). In such a clutch-to-clutch shift, the timing of application of the one clutch is adjusted appropriately with respect to the timing of release of the other clutch, which results in good shifting characteristics (such as a good shift feeling for the driver).

In a clutch-to-clutch shift, a good shift feeling can only be achieved after first sufficiently tuning, for example, the degree to which the clutch to be released is released, the degree to which the clutch to be applied is applied, and the degree to which the engine torque is reduced.

JP(A) 10-184410 discloses a shift control apparatus for an automatic transmission which starts to reduce to the torque through engine control while simultaneously increasing the hydraulic pressure before the rotational speed on the input side of the automatic transmission starts to change, thus enabling the heat load and shock at the initial stage of engagement to be reduced. This shift control apparatus controls an automatic transmission that is provided with i) an automatic shift mechanism that outputs the rotation from the input side to the output side after changing the transmission path by releasing or applying a plurality of friction engaging elements, and ii) a hydraulic pressure circuit that switches the hydraulic pressure provided to a hydraulic pressure servo which releases or applies the friction engaging elements. This shift control apparatus includes i) an input rotational speed sensor that detects the rotational speed on the input side, ii) a pressure regulating circuit that regulates the hydraulic pressure to the hydraulic pressure servo, iii) an engine operating portion that adjusts the engine output torque, iv) a hydraulic pressure control circuit that issues to the pressure regulating circuit a command to increase the hydraulic pressure to the hydraulic pressure servo (hereinafter referred to as a "hydraulic pressure increase command") of the friction engaging element to be applied before there is a change in the rotation on the input side of the automatic shift mechanism during a predetermined shift, and v) an engine control portion that issues a torque-down command (i.e., a command to reduce torque) to the engine operating portion simultaneously with the hydraulic pressure increase command.

Figure 5:
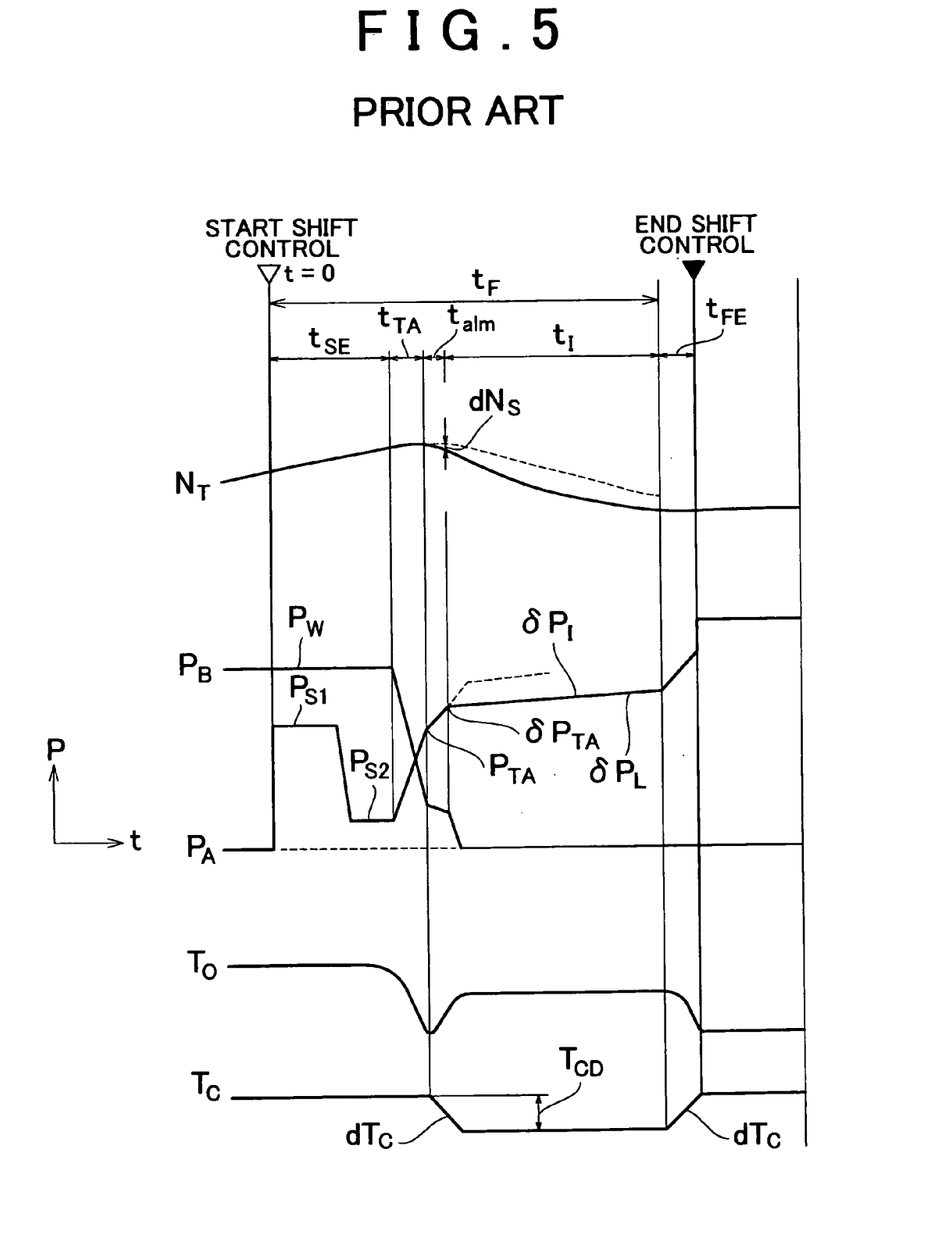
FIG. 5 is a timing chart illustrating operation of a vehicle in which is mounted a conventional automatic transmission.

According to the shift control apparatus disclosed in JP(A) 10-184410, as shown in FIG. 5, when a predetermined shift is made, a hydraulic pressure (application pressure) $P_A$ for a hydraulic pressure servo for the apply side friction engaging element is increased toward a target hydraulic pressure ($P_{TA}$) for right before the input side rotation is changed. The target hydraulic pressure ($P_{TA}$) is calculated according to, for example, input torque ($T_I$). Further, the application pressure $P_A$ is then increased from the target hydraulic pressure by a hydraulic pressure change ($\delta P_{TA}$) calculated based on, for example, a target rotation rate of change until the change in the input side rotation can be determined by detection with an input rotational speed sensor (i.e., until $\Delta N \geq dN_S$). Before the change in the input side rotation is detected (i.e., while $\Delta N < dN_S$), the engine control portion outputs a torque-down command so that the engine torque is reduced at the same time the application pressure ($P_A$) reaches the target hydraulic pressure ($P_{TA}$) for example. By starting a torque reduction of the engine torque at the same time the application pressure is increased, the torque can start to be reduced before inertia torque is generated. As a result, fluctuation in the output shaft torque at the initial stage of engagement is able to be minimized, thereby reducing shock. Further, because the change in rotation is done not only using application pressure but also a torque reduction of the engine torque, the change in rotation can be produced with a low application pressure value, enabling the heat load on the friction members to be reduced during the initial stage of engagement.

The shift control apparatus disclosed in JP(A) 10-184410, however, also has the following problems. As shown in FIG. 5, the engine torque-down control starts at $t_{SE}+t_{TA}$, but after $t_{TA}$, both the upward slope of the hydraulic pressure for the hydraulic pressure servo for the apply side friction engaging element (i.e., application pressure) $P_A$ and the downward slope of the hydraulic pressure for the hydraulic pressure servo for the release side friction engaging element (i.e., release pressure) $P_B$ become gentler. Moreover, after $t_{TA}$, the engine torque also starts to gradually decrease. With this kind of design in which a plurality of control targets are made to gradually increase and decrease, the tuning of those control targets becomes difficult. It is therefore preferable to be able to obtain a good shift feeling without the need for this kind of difficult tuning.

SUMMARY OF THE INVENTION

In view of the foregoing problems, a first aspect of this invention thus provides a control apparatus for an automatic transmission, which executes a shift by simultaneously controlling the release and application of different friction engaging elements. A controller of the control apparatus for the automatic transmission i) controls a clamping force of a friction engaging element to be released (herein referred to as a "release side friction engaging element") and the clamping force of a friction engaging element to be applied (herein referred to as an "apply side friction engaging element"), ii) adjusts an output torque of a prime mover for driving a vehicle, iii) detects a predetermined timing that is after the start of the torque phase during a shift of the automatic transmission and before the clamping force of the apply side friction engaging element increases to the point at which torque input to the automatic transmission can be transmitted by only the apply side friction engaging element, and iv) outputs a command to gradually reduce the clamping force of the release side friction engaging element and a command to gradually increase the clamping force of the apply side friction engaging element in the torque phase. Here, the controller outputs a torque-down command for the prime mover for driving the vehicle in response to detection of the predetermined timing and outputs a command to make the clamping force of the release side friction engaging element 0 in response to detection of the predetermined timing.

In the control apparatus for the automatic transmission described above, the automatic transmission performs a clutch-to-clutch shift without the driver having to rapidly operate the accelerator. In the torque phase, the clamping force of the release side friction engaging element is gradually reduced while the clamping force of the apply side friction engaging element is gradually increased. A timing that is after the start of the torque phase and right before the clamping force of the apply side friction engaging element increases to the point where torque input to the automatic transmission can be transmitted by only the apply side friction engaging element (for example, right before the inertia phase starts) is detected. At this timing, a torque-down command for the engine or motor or the like which serves as the prime mover for driving the vehicle is output so that the torque of the engine or the like decreases, while the clamping force of the release side friction engaging element is made 0. Accordingly, after that timing, the clamping force of the release side friction engaging element is not reduced gradually, but is instead made 0. Even if the release side friction engaging element is suddenly made 0 in this way, shift shock, which would generally occur in such as case, would be reduced because the torque of the engine or the like is reduced. As a result, a control apparatus for an automatic transmission that enables a good shift feeling to be achieved can be provided without the need for complicated tuning of the clamping force of the release side friction engaging element.

Also, another aspect of the invention provides a control method for an automatic transmission by which a shift is executed by simultaneously controlling the release and application of different friction engaging elements. This control method includes the following steps of: i) controlling a clamping force of a release side friction engaging element and the clamping force of an apply side friction engaging element, ii) adjusting an output torque of a prime mover for driving a vehicle, iii) detecting a predetermined timing that is after the start of a torque phase during a shift of the automatic transmission and before the clamping force of the apply side friction engaging element increases to the point at which torque input to the automatic transmission can be transmitted by only the apply side friction engaging element, iv) outputting a command to gradually reduce the clamping force of the release side friction engaging element and a command to gradually increase the clamping force of the apply side friction engaging element in the torque phase, v) outputting a torque-down command for the prime mover for driving the vehicle in response to detection of the predetermined timing, and vi) outputting a command to make the clamping force of the release side friction engaging element 0 in response to detection of the predetermined timing.

In the control method for the automatic transmission described above, the automatic transmission performs a clutch-to-clutch shift without the driver having to rapidly operate the accelerator. In the torque phase, the clamping force of the release side friction engaging element is gradually reduced while the clamping force of the apply side friction engaging element is gradually increased. A timing that is after the start of the torque phase and right before the clamping force of the apply side friction engaging element increases to the point where torque input to the automatic transmission can be transmitted by only the apply side friction engaging element (for example, right before the inertia phase starts) is detected. At this timing, a torque-down command for the engine or motor or the like serving as the prime mover for driving the vehicle is output so that the torque of the engine or the like decreases, while the clamping force of the release side friction engaging element is made 0. Accordingly, after that timing, the clamping force of the release side friction engaging element is not reduced gradually, but is instead made 0. Even if the release side friction engaging element is suddenly made 0 in this way, shift shock, which would generally occur in such as case, would be reduced because the torque of the engine or the like is reduced. As a result, a control apparatus for an automatic transmission that enables a good shift feeling to be achieved can be provided without the need for complicated tuning of the clamping force of the release side friction engaging element.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

In the flowing description and the accompanying drawings, the present invention will be described in more detail with reference to exemplary embodiments.

In the following description, like parts will be denoted by like reference characters. The nomenclature and function of like parts is also the same. Accordingly, detailed descriptions thereof will not be repeated.

A power train of a vehicle that includes a control apparatus according to one exemplary embodiment of the invention will now be described. The control apparatus according to this exemplary embodiment is achieved with an ECU (Electronic Control Unit) 1000, shown in FIG. 1. The automatic transmission described in this exemplary embodiment has a torque converter, which serves as a fluid coupling, and a planetary gear type reduction mechanism. Also, the following description makes reference to a vehicle in which is mounted an engine as the prime mover for driving the vehicle. It should be noted, however, that in this invention the prime mover is not limited to being an engine, i.e., it may alternatively be a motor or the like.

Figure 1:
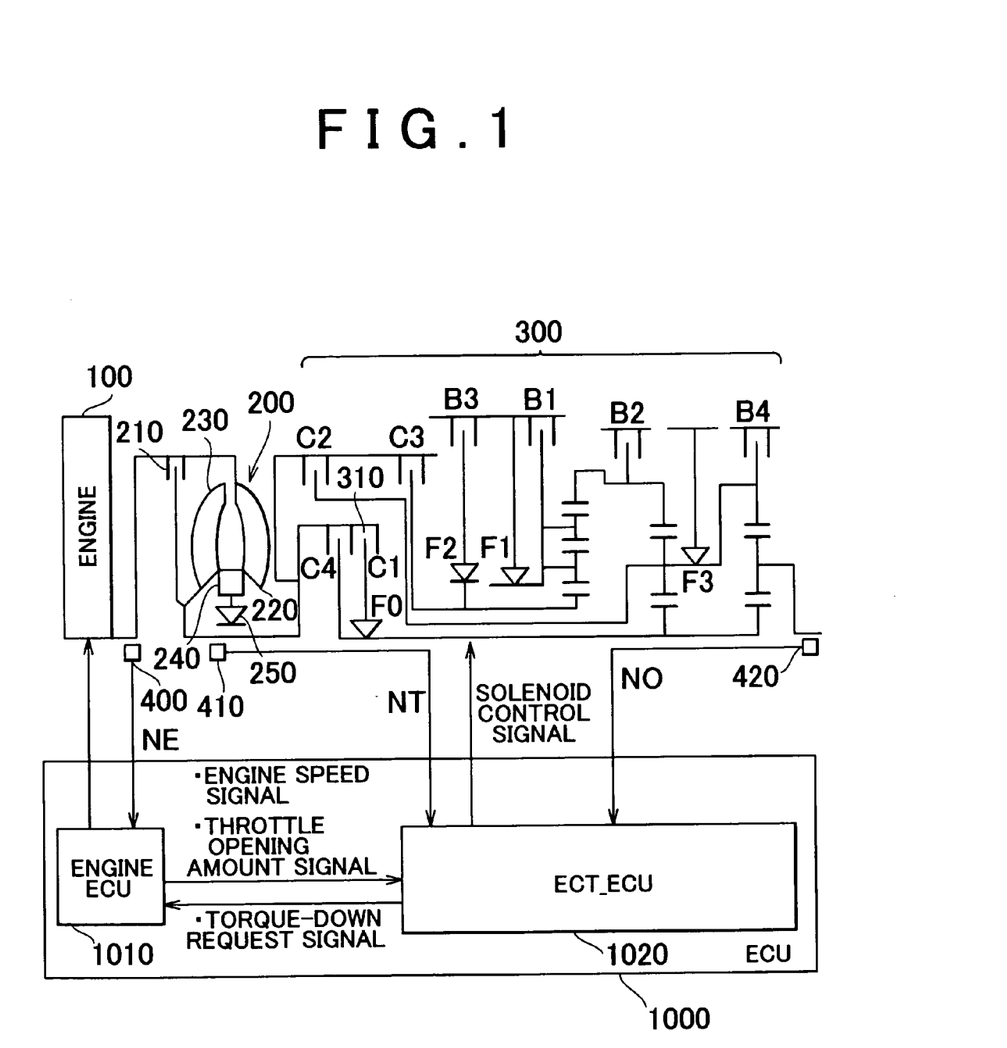
FIG. 1 is a control block diagram of an automatic transmission according to one exemplary embodiment of the invention.

Referring to FIG. 1, the power train of the vehicle includes an engine 100, a torque converter 200, an automatic transmission 300, and an ECU 1000. An output shaft of the engine 100 is connected to an input shaft of the torque converter 200. The engine 100 and the torque converter 200 are linked together via a rotating shaft. Therefore, an output shaft rotational speed NE of the engine 100 (i.e., the engine speed NE) detected by an engine speed sensor 400 and an input shaft rotational speed of the torque converter 200 (i.e., the pump rotational speed) are the same.

The torque converter 200 includes a lockup clutch 210 that locks the input shaft and the output shaft together, a pump impeller 220 on the input shaft side, a turbine impeller 230 on the output shaft side, and a stator 240 used to increase torque, which has a one-way clutch 250. The torque converter 200 and the automatic transmission 300 are connected via a rotating shaft. An output shaft rotational speed NT of the torque converter 200 (i.e., the turbine rotational speed NT) is detected by a turbine rotational speed sensor 410. An output shaft rotational speed NO of the automatic transmission 300 is detected by an output shaft rotational speed sensor 420.

Figure 2:
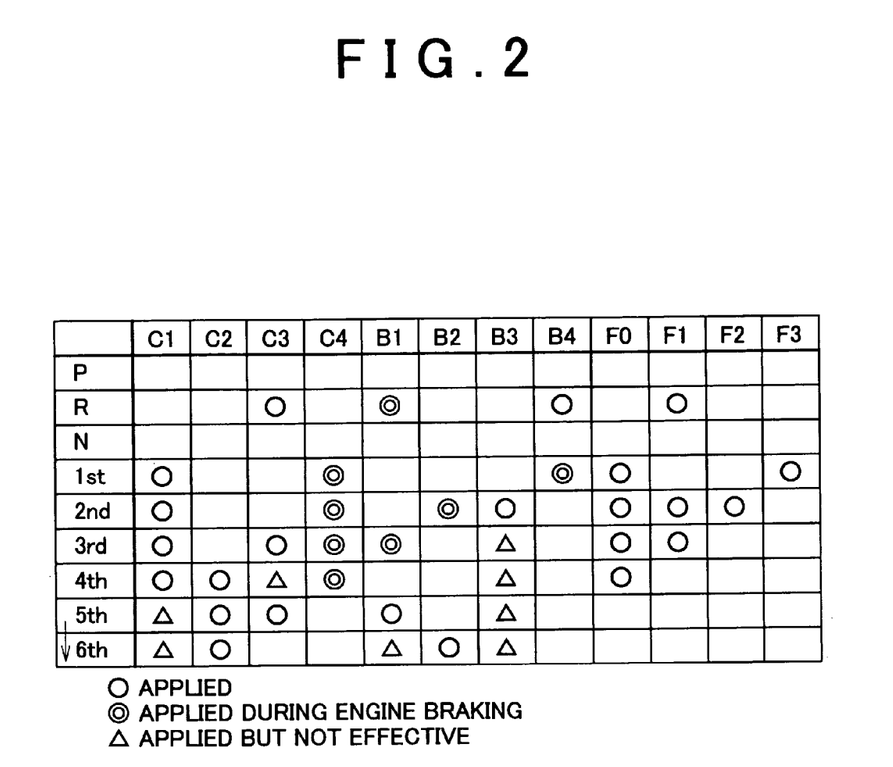
FIG. 2 is a table showing engagement and disengagement combinations of the automatic transmission shown in FIG. 1.

FIG. 2 is a table showing engagement and disengagement combinations of the automatic transmission 300. More specifically, this table shows which of the friction elements, i.e., clutch elements (C1 to C4 in the drawing), brake elements (B1 to B4), and one-way clutch elements (F0 to F3), are applied or released for each speed. In first speed, which is used when the vehicle starts from a standstill, the clutch element (C1) and the one-way clutch elements (F0 and F3) are applied. A clutch-to-clutch shift, which is the subject of control according to this invention, occurs in the case of an upshift from fifth speed to sixth speed in the drawing.

The ECU 1000 that controls the power train includes an engine ECU 1010 that controls the engine 100 and an ECT (Electronic Controlled Automatic Transmission)_ECU 1020 that controls the automatic transmission 300.

The ECT_ECU 1020 receives a signal indicative of the turbine rotational speed NT from the turbine rotational speed sensor 410 and a signal indicative of the output shaft rotational speed NO from the output shaft rotational speed sensor 420. The ECT_ECU 1020 also receives a signal indicative of the engine speed NE detected by the engine speed sensor 400 and a signal indicative of a throttle opening amount detected by a throttle position sensor, both of which are output by the engine ECU 1010.

These rotational speed sensors are disposed facing teeth of rotation detecting gears mounted on the input shaft of the torque converter 200, the output shaft of the torque converter 200, and the output shaft of the automatic transmission 300. These rotational speed sensors are capable of detecting even slight rotation of the input shaft of the torque converter 200, the output shaft of the torque converter 200, and the output shaft of the automatic transmission 300. These sensors may be sensors which use, for example, magnetic resistance elements, generally referred to as semiconductor sensors.

A solenoid control signal is output from the ECT_ECU 1020 to a linear solenoid of the automatic transmission 300 so as to apply or release the clutch elements (C1 to C4), the brake elements (B1 to B4), and the one-way clutch elements (F0 to F3), shown in FIG. 2, appropriately. For example, during an upshift from fifth speed to sixth speed the clamping pressure for the clutch C3 is controlled such that the clutch C3 changes from being in an applied state to a released state, and the clamping pressure for the brake B2 is controlled such that the brake B2 changes from being in a released state to an applied state. More specifically, the ECT_ECU 1020 outputs a solenoid control signal to a linear solenoid valve in the hydraulic pressure circuit. The ECT_ECU 1020 calculates a target hydraulic pressure (i.e., a hydraulic pressure to achieve a target clamping pressure), to be described later, and then calculates a hydraulic pressure for the hydraulic pressure servo from that target hydraulic pressure and the like, which it outputs to the solenoid valve.

The hydraulic pressure circuit has, for example, two linear solenoid valves and a plurality of hydraulic pressure servos which apply and release a plurality of friction engaging elements (i.e., clutches and brakes) used to achieve six forward speeds and one reverse speed by switching transmission paths in a planetary gear unit of the automatic transmission. Further, a solenoid modulator pressure is provided to an intake port of each of the linear solenoid valves. A control hydraulic pressure from an output port of each of these linear solenoid valves is then supplied to control hydraulic chambers of pressure control valves. The pressure control valves supply a line pressure to each of the intake ports, and regulated pressures from the output ports that are regulated by the control hydraulic pressure are supplied to each hydraulic pressure servo appropriately via the respective shift valves.

The hydraulic pressure circuit described is only one example of a hydraulic pressure circuit. In actuality, multiple hydraulic pressure servos for the automatic transmission, as well as multiple shift valves for switching the hydraulic pressure to these hydraulic pressure servos, are provided. Further, the hydraulic pressure servo has a piston, fitted with an oil seal to make it oil-tight, in a cylinder. This piston is moved against a return spring by the regulated pressure from the pressure control valve operating in the hydraulic pressure chamber so as to make an outside friction plate and an inside friction member contact one another. This structure with the friction plate and friction member is the same for both the clutch and the brake.

The ECT_ECU 1020 outputs a torque-down request signal to the engine ECU 1010. Upon receiving the signal, the engine ECU 1010 closes an electromagnetic throttle valve to reduce the torque output from the engine 100.

Figure 3:
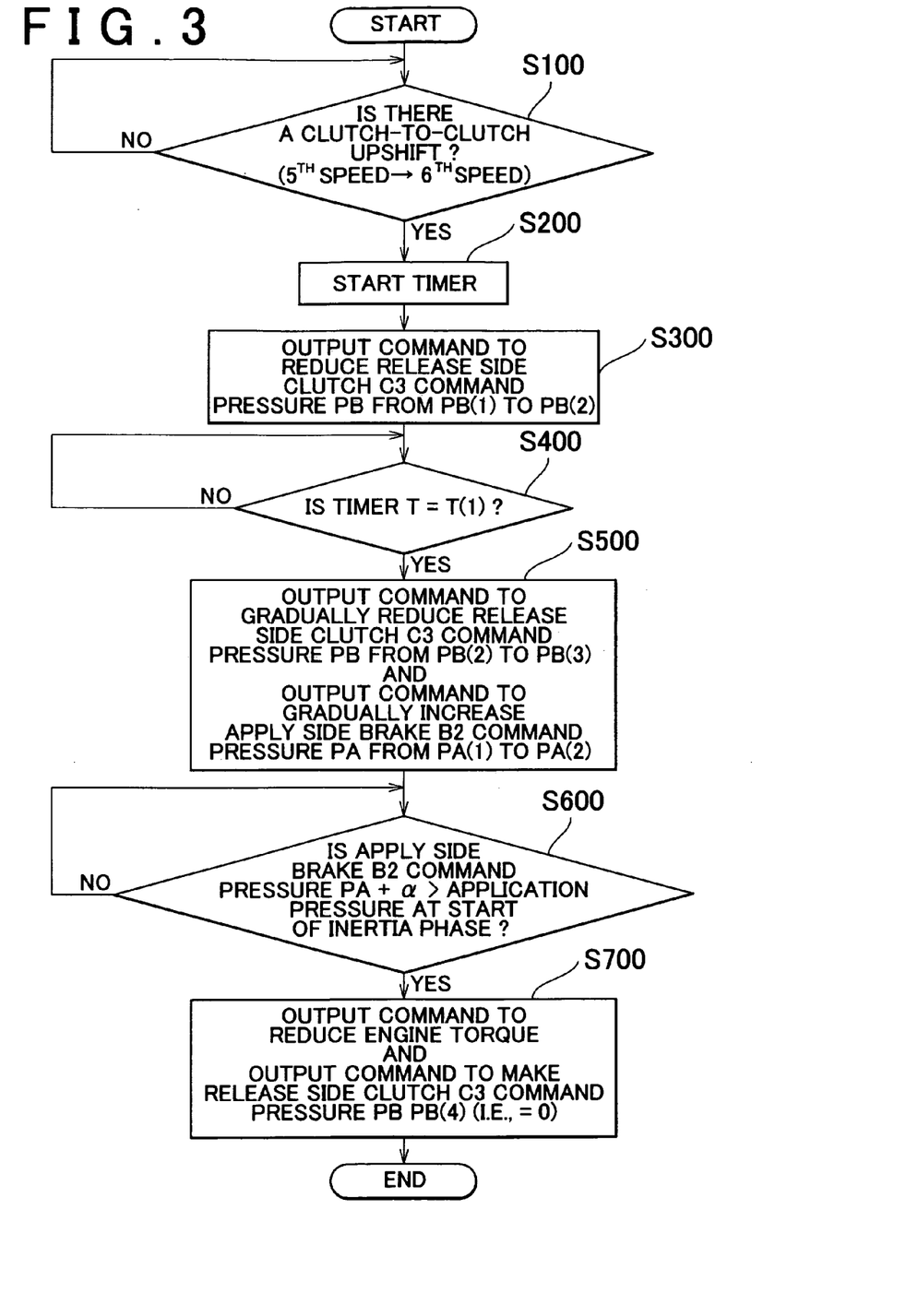
FIG. 3 is a flowchart illustrating the control structure of a program for a shift control routine executed by an ECU shown in the control block diagram of FIG. 1.

Referring to FIG. 3, the control structure of a program executed by the ECT_ECU 1020 which serves as the control apparatus according to this exemplary embodiment will now be described.

In step S100, the ECT_ECU 1020 determines whether a request for a clutch-to-clutch upshift (e.g., fifth speed to sixth speed) has been detected. This determination is made from the throttle opening amount of the engine 100 and the vehicle speed based on an automatic shift line graph (i.e., an automatic shift map). If a request for a clutch-to-clutch upshift has been detected (i.e., YES in step S100), the process proceeds on to step S200. If not (i.e., NO in step S100), the process returns to step S100 and waits until a clutch-to-clutch upshift has been detected. The following description assumes a shift from fifth speed to sixth speed, in which the clutch C3 is released from an applied state and the brake B2 is applied from a released state.

In step S200, the ECT_ECU 1020 starts a timer T provided therein. This timer T is an addition timer. In step S300, the ECT_ECU 1020 outputs a solenoid control signal indicative of a command to reduce a release side clutch (clutch C3) command pressure PB from PB(1) to PB(2).

In step S400, the ECT_ECU 1020 determines whether the time value of the timer T has become T(1). If the time value of the timer T has become T(1) (i.e., YES in step S400), the process proceeds on to step S500. If not (i.e., NO in step S400), the process returns to step S400 and waits for the time value of the timer T to become T(1).

In step S500, the ECT_ECU 1020 outputs a solenoid control signal indicative of a command to gradually reduce the release side clutch (clutch C3) command pressure PB from PB(2) to PB(3). The ECT_ECU 1020 also outputs a solenoid control signal indicative of a command to gradually increase an apply side brake (brake B2) command pressure PA from PA(1) to PA(2).

In step S600, the ECT_ECU 1020 determines whether an apply side brake (brake B2) command pressure PA plus alpha ($\alpha$) is greater than an application pressure at the start of an inertia phase. Here, alpha ($\alpha$) is a margin coefficient and is a positive value. If the apply side brake (brake B2) command pressure PA plus alpha ($\alpha$) is greater than the application pressure at the start of the inertia phase (i.e., YES in step S600), the process proceeds on to step S700. If not (i.e., NO in step S600), the process returns to step S600 and waits until the apply side brake (brake B2) command pressure PA plus alpha ($\alpha$) gradually increases and the apply side brake (brake B2) command pressure PA plus alpha ($\alpha$) is greater than the application pressure at the start of the inertia phase.

In step S700, the ECT_ECU 1020 outputs to the engine ECU 1010 a torque-down request signal indicative of a command to reduce the engine torque. The ECT_ECU 1020 also outputs a solenoid control signal indicative of a command to reduce the release side clutch (clutch C3) command pressure PB to PB(4) (i.e., =0).

Figure 4:
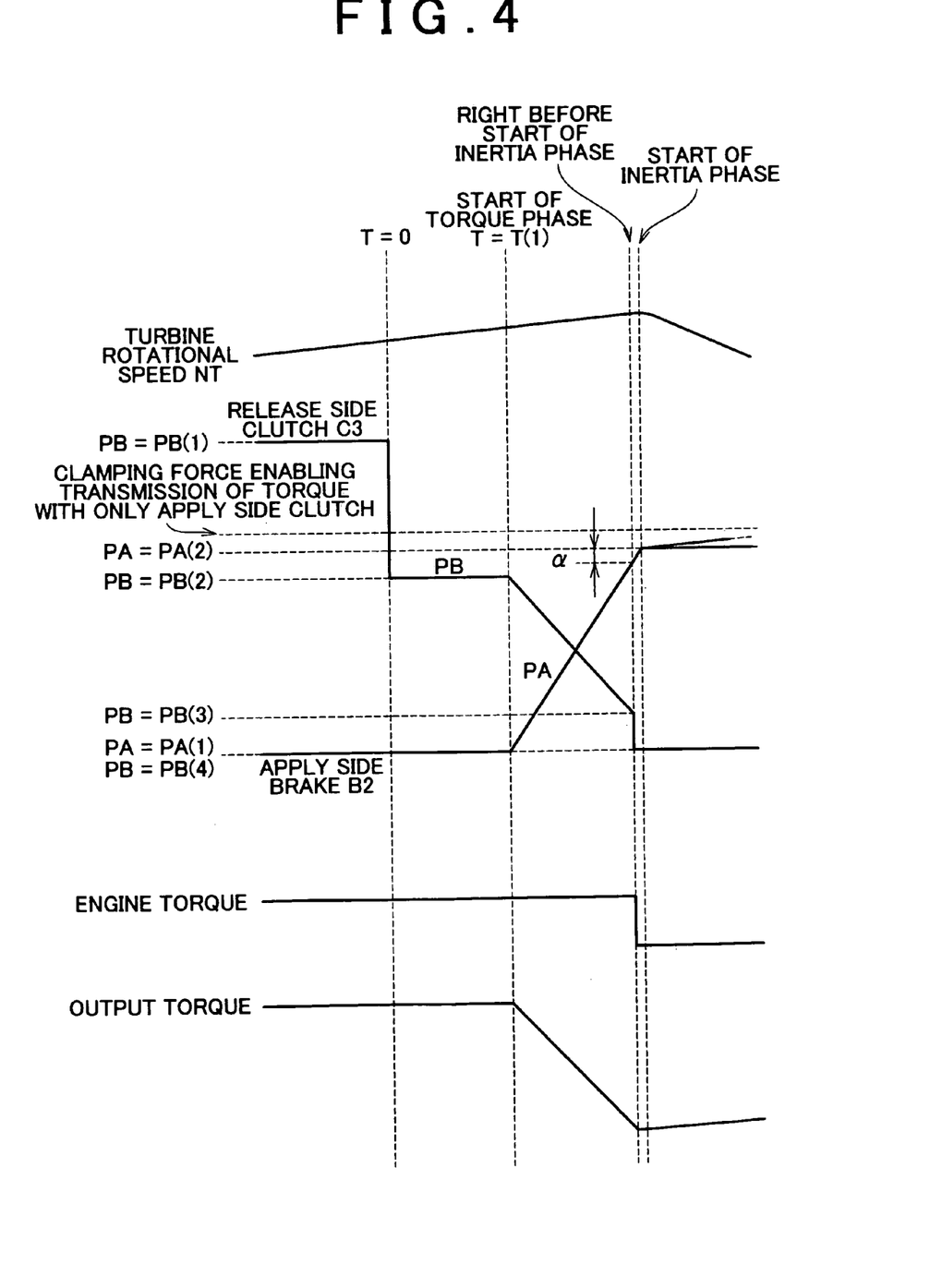
FIG. 4 is a timing chart illustrating operation of a vehicle in which is mounted the automatic transmission according to the exemplary embodiment of the invention.

The operation of the vehicle in which is mounted the ECT_ECU 1020 that serves as the control apparatus according to this exemplary embodiment will now be described based on the foregoing structure and flowchart.

Based on the automatic shift map, a shift determination (such as a fifth speed to sixth speed upshift determination) is made from the throttle opening amount of the engine 100, which is based on an accelerator pedal operation by the driver, and the vehicle speed, while the vehicle is running (step S100). At this time, it is assumed in this shift control that upshift control is performed in a power-on state in which the driver is maintaining substantially constant pressure on the accelerator pedal such that power is being transmitted from the engine to the wheels during the shift.

The time then starts to be measured by the timer (step S200) and the solenoid control signal indicative of a command to reduce the release side clutch (clutch C3) command pressure PB from PB(1) to PB(2) is output (step S300). Accordingly, the release side clutch (clutch C3) command pressure PB for the release side clutch (clutch C3) is reduced from PB(1) to PB(2), as shown in FIG. 4. This release side clutch (clutch C3) command pressure PB(2) is maintained until the torque phase starts. The start of the torque phase is not limited to being detected by the timer. Alternatively, it may be detected based on another physical quantity.

When the time value of the timer T becomes T(1) (i.e., YES in step S400), a solenoid control signal indicative of a command to gradually reduce the release side clutch (clutch C3) command pressure PB from PB(2) to PB(3) is output. Also, a solenoid control signal indicative of a command to gradually increase the apply side brake (brake B2) command pressure PA from PA(1) to PA(2) is output (step S500). Accordingly, the hydraulic pressure of the release side clutch C3 is gradually reduced and the hydraulic pressure of the apply side brake B2 is gradually increased, as shown in FIG. 4.

When the hydraulic pressure of the apply side brake B2 is gradually increased such that the sum of the command pressure PA for the apply side brake B2 and $\alpha$ becomes greater than the application pressure at the start of the inertia phase (i.e., YES in step S600), a torque-down request signal indicative of a command to reduce the engine torque is output to the engine ECU 1010, and a solenoid command signal indicative of a command to reduce the release side clutch C3 command pressure PB to PB(4) (i.e., =0) is output. Accordingly, the engine torque is reduced and the release side clutch C3 command pressure PB drops to 0, as shown in FIG. 4.

At this time, it is not necessary to gradually reduce the clamping force of the release side clutch C3, gradually increase the clamping force of the apply side brake B2, or simultaneously change the clamping force of the release side clutch C3 and the clamping force of the apply side brake B2. The apply side brake B2 does not need to be controlled in a specific manner.

As described above, according to the ECT_ECU which serves as the control apparatus according to this exemplary embodiment, the clamping force of the release side clutch C3 is gradually released and the clamping force of the apply side brake B2 is gradually increased in the torque phase during a clutch-to-clutch shift. At a timing that is after the start of the torque phase and right before the clamping force of the apply side friction engaging element increases to the point where torque input to the automatic transmission can be transmitted by only the apply side friction engaging element (in this case, the timing right before the inertia phase starts when the command pressure is lower by the amount of $\alpha$), the engine torque is decreased and the clamping force of the release side clutch C3 is made 0. After that timing, the clamping force of the release side clutch C3 is not reduced gradually, but instead is made 0. Even if the clamping force of the release side clutch C3 is suddenly made 0 in this way, the torque of the engine or the like is reduced so shift shock, which would generally occur in such as case, would be reduced.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control apparatus for an automatic transmission, which executes a shift by simultaneously controlling release and application of different friction engaging elements, the control apparatus comprising:

a controller which i) controls a clamping force of a friction engaging element to be released and a clamping force of a friction engaging element to be applied, ii) adjusts an output torque of a prime mover for driving a vehicle, iii) detects a predetermined timing that is after the start of a torque phase during a shift of the automatic transmission and before the clamping force of the friction engaging element to be applied increases to the point at which torque input to the automatic transmission can be transmitted by only the friction engaging element to be applied, and iv) outputs a command to gradually reduce the clamping force of the friction engaging element to be released and a command to gradually increase the clamping force of the friction engaging element to be applied, in the torque phase, wherein the controller outputs a command to reduce the torque of the prime mover for driving the vehicle in response to detection of the predetermined timing, and outputs a command to make the clamping force of the friction engaging element to be released 0 in response to detection of the predetermined timing.

2. The control apparatus according to claim 1, wherein the controller outputs a command to maintain the clamping force of the friction engaging element to be applied at the predetermined timing in response to detection of the predetermined timing.

3. The control apparatus according to claim 2, wherein the controller detects, as the predetermined timing, a timing at which the clamping force of the friction engaging element to be applied is a clamping force that is less than a preset clamping force by a predetermined amount.

4. The control apparatus according to claim 3, wherein the preset clamping force is the clamping force when the inertia phase starts.

5. The control apparatus according to claim 1, wherein the controller detects, as the predetermined timing, a timing at which the clamping force of the friction engaging element to be applied is a clamping force that is less than a preset clamping force by a predetermined amount.

6. The control apparatus according to claim 5 wherein the preset clamping force is the clamping force when the inertia phase starts.

7. A control apparatus for an automatic transmission, which executes a shift by simultaneously controlling release and application of different friction engaging elements, the control apparatus comprising:

controlling means for controlling a clamping force of a friction engaging element to be released and a clamping force of a friction engaging element to be applied;

adjusting means for adjusting an output torque of a prime mover for driving a vehicle;

detecting means for detecting a predetermined timing that is after the start of a torque phase during a shift of the automatic transmission and before the clamping force of the friction engaging element to be applied increases to the point at which torque input to the automatic transmission can be transmitted by only the friction engaging element to be applied; and instructing means for outputting commands to the controlling means and the adjusting means, the instructing means comprising:

means for outputting a command to gradually reduce the clamping force of the friction engaging element to be released and a command to gradually increase the clamping force of the friction engaging element to be applied, in the torque phase;

means for outputting to the adjusting means a command to reduce the torque of the prime mover for driving the vehicle in response to detection of the predetermined timing by the detecting means; and means for outputting a command to the controlling means to make the clamping force of the friction engaging element to be released 0 in response to detection of the predetermined timing by the detecting means.

8. The control apparatus according to claim 7, wherein the instructing means further comprises means for outputting a command to the controlling means to maintain the clamping force of the friction engaging element to be applied at the predetermined timing in response to detection of the predetermined timing by the detecting means.

9. The control apparatus according to claim 8, wherein the detecting means includes means for detecting, as the predetermined timing, a timing at which the clamping force of the friction engaging element to be applied is a clamping force that is less than a preset clamping force by a predetermined amount.

10. The control apparatus according to claim 9, wherein the preset clamping force is the clamping force when the inertia phase starts.

11. The control apparatus according to claim 7, wherein the detecting means includes means for detecting, as the predetermined timing, a timing at which the clamping force of the friction engaging element to be applied is a clamping force that is less than a preset clamping force by a predetermined amount.

12. The control apparatus according to claim 11, wherein the preset clamping force is the clamping force when the inertia phase starts.

13. A control method for an automatic transmission by which a shift is executed by simultaneously controlling release and application of different friction engaging elements, the control method comprising the steps of:

controlling a clamping force of a friction engaging element to be released and the clamping force of a friction engaging element to be applied;

adjusting an output torque of a prime mover for driving a vehicle;

detecting a predetermined timing that is after the start of a torque phase during a shift of the automatic transmission and before the clamping force of the friction engaging element to be applied increases to the point at which torque input to the automatic transmission can be transmitted by only the friction engaging element to be applied;

outputting a command to gradually reduce the clamping force of the friction engaging element to be released and a command to gradually increase the clamping force of the friction engaging element to be applied, in the torque phase;

outputting a command to reduce the torque of the prime mover for driving the vehicle in response to detection of the predetermined timing; and outputting a command to make the clamping force of the friction engaging element to be released 0 in response to detection of the predetermined timing.

14. The control method according to claim 13, further comprising the step of:

outputting a command to the controlling means to maintain the clamping force of the friction engaging element to be applied at the predetermined timing in response to detection of the predetermined timing by the detecting means.

15. The control method according to claim 14, further comprising the step of:

detecting, as the predetermined timing, a timing at which the clamping force of the friction engaging element to be applied is a clamping force that is less than a preset clamping force by a predetermined amount.

16. The control method according to claim 15, wherein the preset clamping force is the clamping force when the inertia phase starts.

17. The control method according to claim 13, wherein a timing at which the clamping force of the friction engaging element to be applied is a clamping force that is less than a preset clamping force by a predetermined amount is detected as the predetermined timing.

18. The control method according to claim 17, wherein the preset clamping force is the clamping force when the inertia phase starts.

* * * * *